(12) United States Patent
Yoshizawa et al.

(10) Patent No.: US 11,673,194 B2
(45) Date of Patent: Jun. 13, 2023

(54) SLIDABLE COMPONENT INCLUDING WEAR-RESISTANT COATING AND METHOD OF FORMING WEAR-RESISTANT COATING

(71) Applicant: IHI Corporation, Koto-ku (JP)

(72) Inventors: Hiroki Yoshizawa, Tokyo (JP); Mitsutoshi Watanabe, Tokyo (JP); Yukihiro Shimoda, Tokyo (JP)

(73) Assignee: IHI Corporation, Koto-ku (JP)

( * ) Notice: Subject to any disclaimer, the term of this patent is extended or adjusted under 35 U.S.C. 154(b) by 1089 days.

(21) Appl. No.: 16/379,836

(22) Filed: Apr. 10, 2019

(65) Prior Publication Data

US 2019/0233949 A1    Aug. 1, 2019

Related U.S. Application Data

(63) Continuation of application No. PCT/JP2017/013200, filed on Mar. 30, 2017.

(30) Foreign Application Priority Data

Nov. 9, 2016 (JP) .............................. JP2016-218835

(51) Int. Cl.
*C23C 26/00* (2006.01)
*B22F 3/16* (2006.01)
(Continued)

(52) U.S. Cl.
CPC ................ *C23C 26/00* (2013.01); *B22F 1/16* (2022.01); *B22F 3/16* (2013.01); *B22F 7/04* (2013.01);
(Continued)

(58) Field of Classification Search
None
See application file for complete search history.

(56) References Cited

U.S. PATENT DOCUMENTS

2003/0183529 A1* 10/2003 Ohara ..................... C23C 28/44
205/110
2005/0211165 A1 9/2005 Goto et al.
(Continued)

FOREIGN PATENT DOCUMENTS

| CN | 1572893 A | 2/2005 |
|---|---|---|
| CN | 1650047 A | 8/2005 |

(Continued)

OTHER PUBLICATIONS

Puetz et al. (Characterization of transient oxide formation on CoNiCrAlY after heat treatment in vacuum and air), Surface & Coatings Technology 205 (2010) pp. 647-657 (Year: 2010).*

(Continued)

*Primary Examiner* — Elizabeth Collister
(74) *Attorney, Agent, or Firm* — Oblon, McClelland, Maier & Neustadt, L.L.P.

(57) ABSTRACT

A slidable component including a wear-resistant coating includes a slidable component, and a wear-resistant coating provided on a slide surface of the slidable component. The wear-resistant coating includes metal particles deposited on the side surface of the slidable component, and containing Ni, Co and Cr, and a first oxide layer covering surfaces of the metal particles, containing an Al oxide as its main component, and containing a Y oxide.

6 Claims, 10 Drawing Sheets

(51) Int. Cl.
  *F01D 5/28* (2006.01)
  *F02C 7/00* (2006.01)
  *B22F 7/04* (2006.01)
  *B22F 1/16* (2022.01)

(52) U.S. Cl.
  CPC .............. *F01D 5/28* (2013.01); *F01D 5/284* (2013.01); *F01D 5/288* (2013.01); *F02C 7/00* (2013.01); *F05D 2230/90* (2013.01); *F05D 2300/21* (2013.01); *F05D 2300/2112* (2013.01); *F05D 2300/6033* (2013.01); *F05D 2300/611* (2013.01)

(56) References Cited

U.S. PATENT DOCUMENTS

| | | | |
|---|---|---|---|
| 2006/0035068 A1* | 2/2006 | Ochiai | B23K 9/186 428/305.5 |
| 2009/0092845 A1 | 4/2009 | Goto et al. | |
| 2011/0036721 A1 | 2/2011 | Kobayashi | |
| 2012/0037070 A1 | 2/2012 | Yoshizawa et al. | |
| 2012/0321478 A1 | 12/2012 | Oikawa et al. | |

FOREIGN PATENT DOCUMENTS

| | | | | |
|---|---|---|---|---|
| EP | 1 526 191 A1 | 4/2005 | | |
| EP | 1 544 321 A1 | 6/2005 | | |
| EP | 2 062 998 A1 | 5/2009 | | |
| EP | 2 420 594 A1 | 2/2012 | | |
| JP | 60-258481 | 12/1985 | | |
| JP | 1-172554 | 7/1989 | | |
| JP | 6-322437 | 11/1994 | | |
| JP | 10-195547 | 7/1998 | | |
| JP | 2001-152803 | 6/2001 | | |
| JP | WO2004/011696 A1 | 2/2004 | | |
| JP | 2004-099955 | 4/2004 | | |
| JP | 2005-213560 | 8/2005 | | |
| JP | 2005-214054 | 8/2005 | | |
| JP | 2007-039752 | 2/2007 | | |
| JP | WO2010/119865 A1 | 10/2010 | | |
| JP | 2012052206 A | * | 3/2012 | ............ C23C 28/04 |
| JP | 2013-1949 | 1/2013 | | |

OTHER PUBLICATIONS

Machine translation via Espacenet of JP2012052206A (Year: 2012).*
Y. Zhang, Electrodeposited MCrAlY Coatings for Gas Turbine Engine Application, JOM, vol. 67, No. 11, 2015, pp. 2599-2607. (Year: 2015).*
Combined Chinese Office Action and Search Report dated Aug. 5, 2020 in Chinese Patent Application No. 201780061467.9, 6 pages.
Extended European Search Report dated Feb. 24, 2020, in Patent Application No. 17869814.8, 9 pages.
International Search report dated May 23, 2017 in PCT/JP2017/013200, filed on Mar. 30, 2017 (with English Translation).
Written Opinion report dated May 23, 2017 in PCT/JP2017/013200, filed on Mar. 30, 2017.

* cited by examiner

SLIDABLE COMPONENT INCLUDING WEAR-RESISTANT COATING AND METHOD OF FORMING WEAR-RESISTANT COATING

CROSS REFERENCE TO RELATED APPLICATIONS

This application is a continuation application of International Application No.PCT/JP2017/013200, filed on Mar. 30, 2017, which claims priority to Japanese Patent Application No. 2016-218835, filed on Nov. 9, 2016, the entire contents of which are incorporated by references herein.

BACKGROUND

1. Field

This disclosure relates to a slidable component including a wear-resistant coating, and a method of forming a wear-resistant coating.

2. Description of the Related Art

In a conventional practice, a wear-resistant coating provided on a slide surface of a slidable component, such as a gas turbine component, is formed by overlaying a cobalt (Co)-based alloy, such as a Stellite alloy or a Tribaloy alloy, on the slide surface by TIG welding or the like. Japanese Patent Application Publication No. 2013-1949 (Patent Literature 1) discloses that a Stellite alloy as a Co-based alloy is joined to the blade distal end portion of a steam turbine long blade by TIG welding.

SUMMARY

With an improvement in the performance of a jet engine and the like, a slidable component, such as a gas turbine component, is sometimes exposed to a high-temperature environment of over 1000° C. When a Co-based alloy, such as a Stellite alloy or a Tribaloy alloy, is exposed to such a high-temperature environment, there is likelihood that an oxide film spalls and is thus delaminated from the slidable component. This shows that the exposure of a wear-resistant coating made of a Co-based alloy to the high-temperature environment of over 1000° C. may cause delamination of an oxide film, and accordingly decreases the wear resistance of the wear-resistant coating.

With this taken into a consideration, an object of the disclosure is to provide a slidable component including a wear-resistant coating whose wear resistance can be improved to withstand a high-temperature environment of over 1000° C., and a method of forming a wear-resistant coating.

A slidable component including a wear-resistant coating according to an embodiment of the present disclosure includes a slidable component, and a wear-resistant coating provided on a slide surface of the slidable component. The wear-resistant coating includes metal particles deposited on the slide surface of the slidable component, and containing Ni, Co and Cr, and a first oxide layer covering surfaces of the metal particles, containing an Al oxide as its main component, and containing a Y oxide.

In the slidable component including a wear-resistant coating according to the embodiment of the present disclosure, the wear-resistant coating includes a second oxide layer formed between the metal particles covered with the first oxide layer, and containing a Cr oxide as its main component.

In the slidable component including a wear-resistant coating according to the embodiment of the present disclosure, the metal particles further contain at least one of Al and Y.

In the slidable component including a wear-resistant coating according to the embodiment of the present disclosure, the slidable component is a gas turbine component.

In the slidable component including a wear-resistant coating according to the embodiment of the present disclosure, the gas turbine component is a turbine blade including a shroud portion with a Z notch, and the wear-resistant coating is provided on a slide surface of the Z notch.

A method of forming a wear-resistant coating according to the embodiment of the present disclosure includes an electrode forming step of forming an electrode for electrical-discharge surface treatment, and an electrical-discharge surface treatment step of forming a wear-resistant coating on a slide surface of a slidable component by electrical-discharge surface treatment by causing an electrical discharge between the electrode and the slidable component. The electrode forming step includes an electrode powder forming step of pulverizing raw material powder of an alloy containing Ni, Co, Cr, Al and Y to form large-particle-size powder with a mean particle size of 8 µm or less, and small-particle-size powder with a particle size of 3 µm or less, a granulation step of mixing and granulating the large-particle-size powder and the small-particle-size powder to form granulated powder, a compression molding step of molding the granulated powder into a green compact by compression molding, and a sintering step of sintering the green compact by heating to form the electrode made of the sintered compact.

In the method of forming a wear-resistant coating according to the embodiment of the present disclosure, in the sintering step, the green compact is sintered at 750° C. or higher but 1000° C. of lower.

According to the above configuration, the wear-resistant coating is good at oxidation resistance in a high-temperature environment of over 1000° C., and the wear resistance of the slidable component including the wear-resistant coating can be improved.

DESCRIPTION OF EMBODIMENTS

Figure 1:
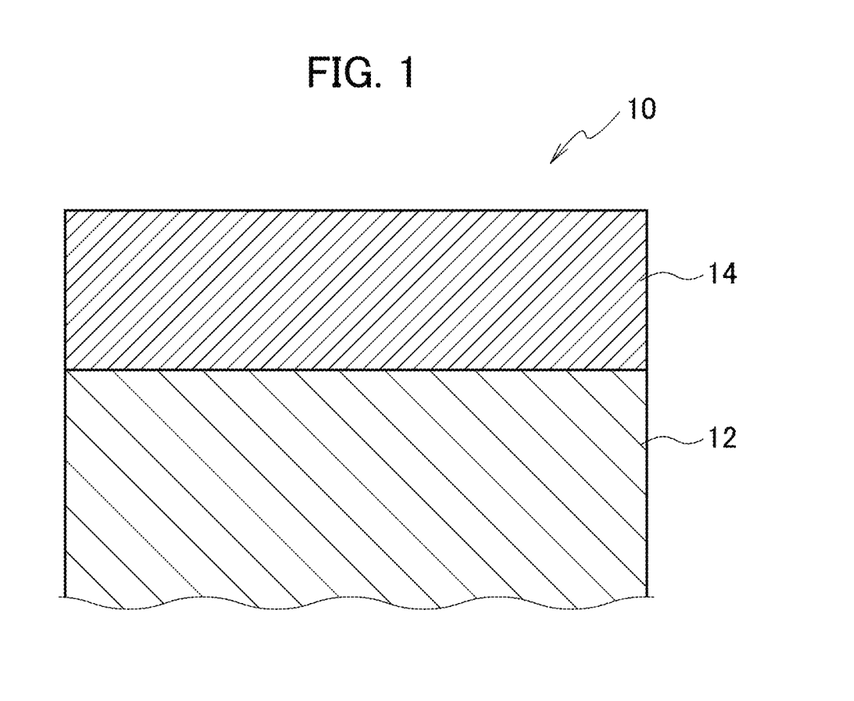
FIG. 1 is a cross-sectional diagram illustrating a configuration of a slidable component including a wear-resistant coating according to an embodiment of the present disclosure.

Using the drawings, detailed descriptions will be hereinbelow provided for an embodiment of the present disclosure. FIG. 1 is a cross-sectional diagram illustrating a configuration of a slidable component 10 including a wear-resistant coating. The slidable component 10 including a wear-resistant coating includes a slidable component 12, and a wear-resistant coating 14 provided on a side surface of the slidable component 12.

The slidable component 12 is a gas turbine component or the like, for example, a component, such as an aircraft jet engine component or an industrial gas turbine component, which is exposed to a high-temperature environment of over 1000° C. An example of the aircraft jet engine component is a turbine blade including a shroud portion integrated therein.

The slidable component 12 is made of, for example, a Ni-based alloy, a ceramic matrix composite (CMC), or the like A single crystal Ni-based alloy, a unidirectionally-solidified N-based alloy or the like may be used as the Ni-based alloy. A SiC/SiC composite with a SiC matrix reinforced with SiC fibers, or the like may be used as the ceramic matrix composite (CMC).

For example, fretting wear, impact wear and the like occur on the slide surface of the slidable component 12. The fretting wear is caused by repeated fine sliding motions with surface pressure applied to the slide surface. The impact wear is caused by a repeated series of periodical pressures and sliding motions.

The wear-resistant coating 14 includes metal particles deposited on the slide surface of the slidable component 12, and containing Ni, Co and Cr, and a first oxide layer covering surfaces of the metal particles, containing an Al oxide as its main component, and containing a Y oxide. The coating thickness of the wear-resistant coating 14 may be, for example, 100 μm to 500 μm.

The metal particles are deposited on the slide surface of the slidable component 12, and contain Ni (nickel), Co (cobalt), and Cr (chromium). Multiple layers of the metal particles are deposited on the slide surface of the slidable component 12. The metal particles are each formed in the shape of a dendrite, or the like.

Ni and Co have a function of, when alloyed, improving heat resistance and high-temperature hardness in the high-temperature environment of over 1000° C. The metal particles may contain at least one of Ni and Co as their main component. The main component means a component whose content in the metal particles is larger than that of any other component therein. The metal particles may contain Ni as their main component, may contain Co as their main component, and may contain Ni and Co as their main component. In a case where the metal particles contains Ni as their main component, the content of Ni in the metal particles may be, for example, 47% by mass or more but 58% by mass or less, and the content of Co in the metal particles may be, for example, 24% by mass or more but 29% by mass or less.

When selectively oxidized, Cr forms a Cr oxide good at lubricity, and therefore has a function of improving wear resistance. The Cr oxide is chromium oxide ($Cr_2O_3$) or the like. The content of Cr in the metal particles may be, for example, 11% by mass or more but 19% by mass or less.

The metal particles may further contain at least one of Al (aluminum) and Y (yttrium) to be alloyed. The metal particles may contain Al, may contain Y, or may contain both Al and Y. This is because even in a case where the Al oxide and the Y oxide in the later-discussed first oxide layer are exhausted due to wear or the like, an Al oxide and a Y oxide obtained from selectively-oxidized Al and Y in the metal particles can be supplied to the first oxide layer. The content of Al in the metal particles may be, for example, 9% by mass or less. The content of Y in the metal particles may be, for example, 0.5% by mass or less.

The first oxide layer covers the surfaces of the metal particles, contains the Al oxide as its main component, and contains the Y oxide. The first oxide layer has a function of inhibiting the oxidation of the metal particles and improving the lubricity. The main component means a component whose content in the first oxide layer is larger than that of any other component therein. In addition, the first oxide layer may cover at least part of the surfaces of the metal particles, and may cover all the surfaces of the metal particles.

The Al oxide is an oxide which is more stable than the Cr oxide and a Si oxide in the high-temperature environment of over 1000° C. Furthermore, the Al oxide forms a dense protective film which is good at oxidation resistance. Since the first oxide layer contains the Al oxide as its main component, the first oxide layer can inhibit the oxidation of the metal particles even in the high-temperature environment of over 1000° C. In addition, since the Al oxide is good at lubricity even in the high-temperature environment of over 1000° C., the Al oxide can improve the wear resistance. The Al oxide is aluminium oxide ($Al_2O_3$) or the like.

The Y oxide has a function of increasing the adhesion between the metal particles and the first oxide layer. Even in a case where the slidable component 10 including a wear-resistant coating is repeatedly exposed to heat, the delamination of the first oxide layer from the metal particles can be inhibited. Furthermore, in a case where the slidable component 12 or the metal particles contain a slight amount of S (sulfur), Y in the Y oxide is bonded to S, and the occurrence of voids can be inhibited there. The Y oxide is yttrium oxide ($Y_2O_3$) or the like.

The first oxide layer may contain at least one of a Ni oxide such as a nickel oxide, a Co oxide such as a cobalt oxide, and a Cr oxide such as a chromium oxide.

The wear-resistant coating 14 includes a second oxide layer formed between the metal particles covered with the first oxide layer, and containing a Cr oxide as its main component. The main component means a component whose content in the second oxide layer is larger than that of any other component therein. The second oxide layer is formed between the metal particles covered with the first oxide layer.

The Cr oxide is better at lubricity than the Al oxide in the temperature environment of 1000° C. or less. Since the second oxide layer contains the Cr oxide as its main component, the second oxide layer can improve the wear resistance in an environment of 1000° C. or less which leads to the high-temperature environment of over 1000° C. The Cr oxide is chrome oxide ($Cr_2O_3$) or the like. The second oxide layer may further contain at least one of a Ni oxide such as a nickel oxide, a Co oxide such as a cobalt oxide, an Al oxide such as aluminium oxide, and a Y oxide such as yttrium oxide.

Figure 2:
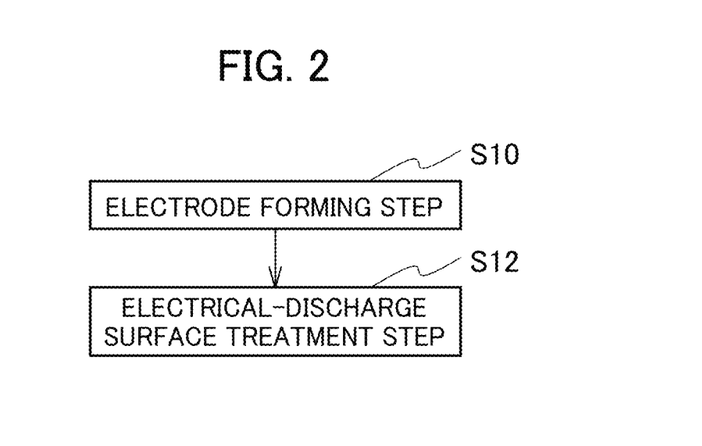
FIG. 2 is a flowchart illustrating a method of producing a wear-resistant coating according to the embodiment of the present disclosure.

Next, descriptions will be provided for a method of forming the wear-resistant coating 14. FIG. 2 is a flowchart illustrating the method of forming the wear-resistant coating 14. The method of forming the wear-resistant coating 14 includes an electrode forming step (S10), and an electrical-discharge surface treatment step (S12).

The electrode forming step (S10) is a step of forming an electrode for electrical-discharge surface treatment. The electrode forming step (S10) includes an electrode powder forming step, a granulation step, a compression molding step, and a sintering step.

The electrode powder forming step is a step of pulverizing raw material powder of an alloy containing Ni, Co, Cr, Al and Y to form large-particle-size powder with a mean particle size of 8 μm or less, and small-particle-size powder with a particle size of 3 μm or less.

Powder of an alloy containing Ni, Co, Cr, Al and Y is used as the raw material powder. Powder of an alloy containing at least one of Ni and Co as its main component may be used as the raw material powder. The main component means a component whose content in the raw material powder is larger than that of any other component therein. For example, powder of a NiCoCrAlY alloy or powder of a CoNiCrAlY alloy may be used as the raw material powder. In a case where powder of an alloy containing Ni as its main component is used as the raw material powder, the raw material powder may be, for example, alloy powder which contains 20% by mass or greater but 26% by mass or less of Co, 15% by mass or greater but 19% by mass or less of Cr, 11% by mass or greater but 14% by mass or less of Al, 0.1% by mass or greater but 1% by mass or less of Y, and the balance including Ni and unavoidable impurities. The alloy powder obtained by atomization or the like may be used as the raw material powder. For example, the alloy powder with a 90% cumulative particle diameter ($D_{90}$) in the cumulative particle size distribution smaller than 22 μm may be used as the raw material powder.

The raw material powder is pulverized using a jet mill or the like to form the large-particle-size powder with a mean particle size of 8 μm or less, and the small-particle-size powder with a particle size of 3 μm or less. A swirling-flow-type jet mill or the like may be used as the jet mill. The pulverizing pressure may be 0.4 Mpa or greater but 2.6 Mpa or less. The large-particle-size powder is classified using a cyclone or the like, and is thereby collected. The small-particle-size powder is caught using a bug filter or the like, and is thereby collected. The shape of the large-particle-size powder particles may be spherical and polygonal. The shape of the small-particle-size powder particles is like a scale.

In a case where the electrode is formed from the large-particle-size powder and the small-particle-size powder, the small-particle-size powder can be interposed in the large-particle-size powder. This makes it possible to appropriately control the density of the electrode in order to prevent the density of the electrode from becoming excessively high, and thereby to reduce the thermal conductivity of the electrode to a low level. Thus, the heat of the electrical-discharge plasma is hard to escape from the distal end portion of the electrode, and raises the temperature of the distal end portion of the electrode. Accordingly, the electrode material easily melts or half-melts.

The reason why the mean particle size of the large-particle-size powder is 8 μm or less is that if the mean particle size of the large-particle-size powder is greater than 8 μm, it is difficult to compression-mold the large-particle-size powder. The reason why the particle size of the small-particle-size powder is 3 μm or less is that if the particle size of the small-particle-size powder is greater than 3 μm, the density of the electrode is highly likely to become larger. The particle size of the small-particle-size powder may be 1 μm or less. The mean particle size is obtained, for example, by using a particle-size distribution of dimeters of the particles measured using a laser diffraction scattering method, accumulating the particle-size distribution starting with the smallest particle size, and defining the accumulated value at 50% as a particle diameter (median diameter).

The granulation step is a step of mixing and granulating the large-particle-size powder with a mean particle size of 8 μm or less and the small-particle-size powder with a particle size of 3 μm or less to form granulated powder. To begin with, a slurry of a mixture of the large-particle-size powder and the small-particle-size powder is prepared. The mixture ratio of the large-particle-size powder to the small-particle-size powder may be such that the amount of large-particle-size powder is 30% by mass or greater but less than 100% by mass when a sum of the amount of large-particle-size powder and the amount of small-particle-size powder is 100% by mass. This is because if the amount of large-particle-size powder is less than 30% by mass, the density of the electrode is large, and the thermal conductivity of the electrode is highly likely to become high.

The slurry is prepared by putting the large-particle-size powder, the small-particle-size powder, a binder, and a lubricant into a solvent contained in a tank, and stirring and mixing them using an agitator or the like. A thermoplastic resin such as polypropylene (PP), polyethylene (PE), polymethyl methacrylate (PMMA) or a polyvinyl alcohol (PVA), or a polysaccharide such as agar is used as the binder. Stearic acid, paraffin wax, zinc stearate or the like may be used as the lubricant. For example, 1% by mass to 10% by mass of lubricant may be added to the slurry.

After the preparation of the slurry, the granulated powder is formed from the slurry using a spray dryer or the like. In a case where the granulation is performed using the spray dryer, the slurry is sprayed from the nozzle of the spray dryer into a high-temperature nitrogen gas atmosphere in the spray dryer. Thereby, the solvent contained in the slurry is dried and removed, and the granulated powder is formed.

The compression molding step is a step of molding the granulated powder into a green compact by compression molding. The granulated powder is filled into a molding die, and is compressed using a press. Thereby, the granulated powder is molded into the green compact by compression molding. The surface pressure applied using the press may be, for example, 10 MPa to 30 MPa. The tap-density (bulk density) of the green compact may be 3.5 g/cm$^3$ to 4.5 g/cm$^3$.

The compression molding step may be combined with CIP (cold isostatic pressing).

The sintering step is a step of sintering the green compact by heating to form the electrode made of the sintered compact. The green compact is sintered using a heating furnace such as a vacuum heating furnace or an atmosphere furnace. The green compact is sintered by being thermally treated using a heater or the like in vacuum, an inert atmosphere, or a reducing atmosphere. The sintering may be performed with the electrode powder holding its shape such that the bond between the powder particles at their contact portions is moderately strong.

The sintering temperature may be 750° C. or greater but 1000 C.° or less. This is because if the sintering temperature is less than 750° C., there is likelihood that the bond between the powder particles at their contact portions is week. This is because if the sintering temperature is greater than 1000° C., there is likelihood that the bond between the powder particles at their contact portions is excessively strong. The holding time at the sintering temperature may be 5 hours or greater but 15 hours or less.

The electric resistivity of the electrode for diffusion surface treatment may be 1 mΩ·cm to 30·mΩ·cm. There is a negative correlation between the thermal conductivity and the electric resistivity. For this reason, as the thermal conductivity becomes lower, the electric conductivity becomes lower, and the electric resistivity becomes larger. While the electric resistivity of the electrode is in this range, the electrode can sufficiently follow the cycle of the pulsed electrical discharge, and can hold the thermal conductivity at an appropriate level. Thereby, the heat of the electrical-discharge plasma is hard to escape from the distal end portion of the electrode, and the electrode can keep its distal end portion at high temperature. As above discussed, the electrode for the electrical-discharge surface treatment is formed.

The electrical-discharge surface treatment step (S12) is a step of forming the wear-resistant coating 14 on the slide surface of the slidable component 12 by electrical-discharge surface treatment by causing an electrical discharge between the electrode for the electrical-discharge surface treatment and the slidable component 12.

Figure 3:
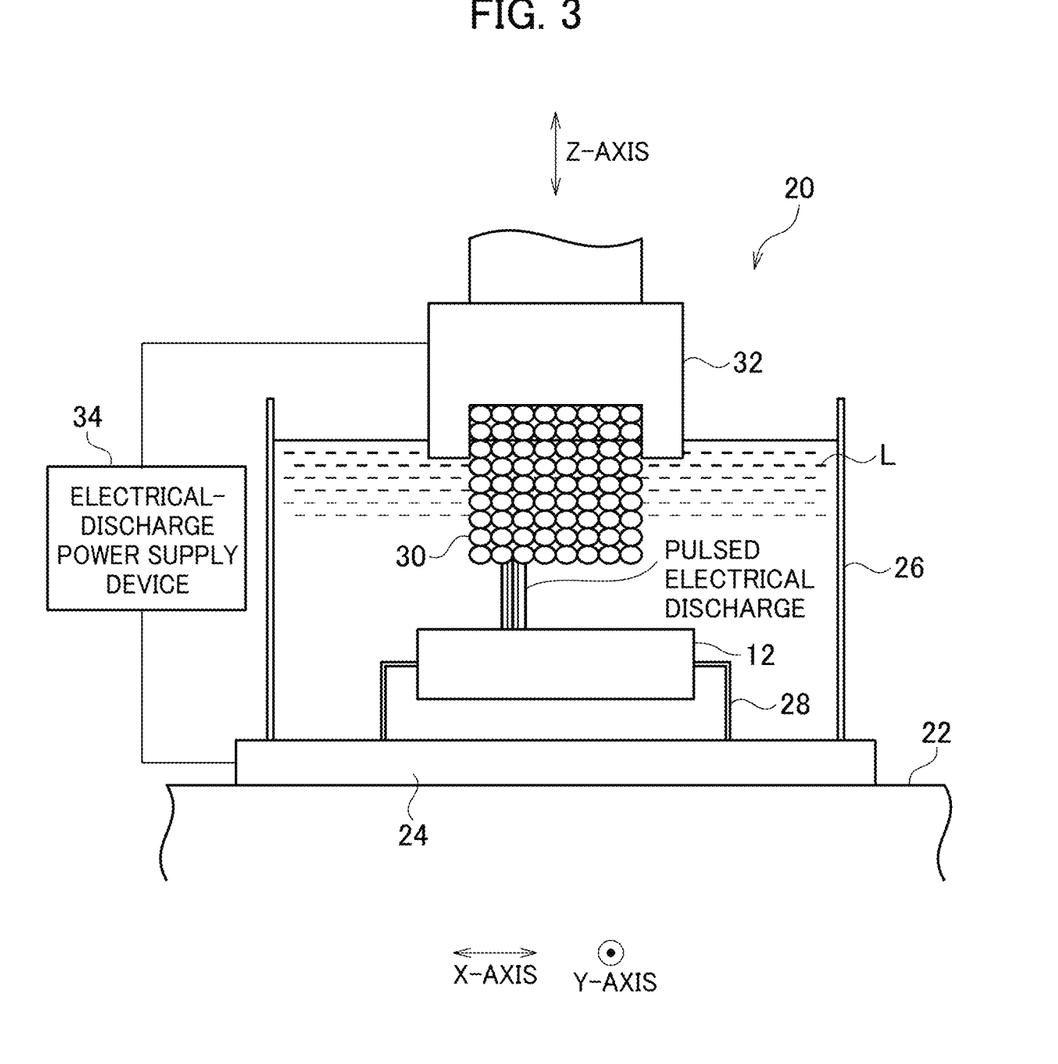
FIG. 3 is a schematic diagram illustrating a configuration of an electrical-discharge machining apparatus according to the embodiment of the present disclosure.

To begin with, descriptions will be provided for electrical-discharge machining apparatus. FIG. 3 is a schematic diagram illustrating a configuration of the electrical-discharge machining apparatus 20. The electrical-discharge machining apparatus 20 includes a bed 22. The bed 22 is provided with a table 24. The table 24 is provided with a liquid tank 26 which contains an electrically-insulating liquid L such as insulating oil. The liquid tank 26 is provided with a jig 28 which allows the slidable component 12 made of the nickel alloy or the like to be set thereon. An electrode holder 32 for holding the electrode 30 for the electrical-discharge surface treatment is provided above the table 24 in a way that makes the electrode holder 32 movable in X-axis direction, Y-axis direction, and Z-axis direction. The electrode holder 32 is configured to be rotatable on the Z axis. An electrical-discharge power supply device 34 is electrically connected to the jig 28 and the electrode holder 32. A publicly-known electrical-discharge power supply device may be used as the electrical-discharge power supply device 34.

Next, descriptions will be provided for an electrical-discharge surface treatment method. The slidable component 12 is set on the jig. 28. The electrode 30 for the electrical-discharge surface treatment is positioned relative to the slidable component 12 by moving the electrode holder 32, which holds the electrode 30, in the X-axis direction and Y-axis direction. Thereafter, the electrical-discharge power supply device 34 causes a pulsed electrical discharge between the electrode 30 and the slidable component 12 in the electrically-insulating liquid L while making the electrode holder 32 reciprocate in the Z-axis direction. The energy of this electrical discharge makes the electrode material or a reactant on the electrode material adhere to the slide surface of the slidable component 12 to form the wear-resistant coating 14 on the slide surface of the slidable component 12.

To put it specifically, once the electrical discharge occurs between the electrode 30 and the slidable component 12, part of the electrode material is separated from the electrode due to the blast of the electrical discharge and the electrostatic force, and melts or half-melts due to the heat of the electrical discharge plasma. The separated part of the electrode material, in a molten or half-molten state, moves toward the slidable component 12, and reaches the slide surface of the slidable component 12 to re-solidify into metal particles. While the pulsed electrical discharge is continuously caused, parts of the electrode material move one after another from the distal end of the electrode toward the slide surface of the slidable component 12 to re-solidify and be deposited onto the slide surface. Thereby, the metal particles are deposited onto the slide surface of the slidable component 12.

Figure 4:
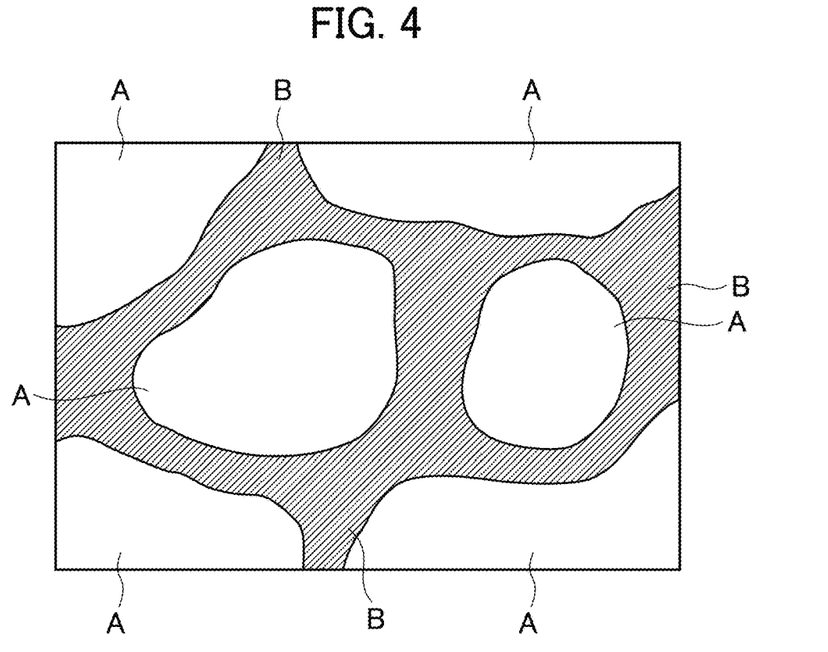
FIG. 4 is a schematic diagram illustrating a cross section of the wear-resistant coating formed by electrical-discharge surface treatment in the embodiment of the present disclosure.

Furthermore, oxygen adheres to the surface of the electrode powder. This oxygen selectively oxidizes Al and Y contained in the metal particles. Thereby, the first oxide layer which contains the Al oxide as its main component and contains the Y oxide is formed covering the surfaces of the metal particles. FIG. 4 is a schematic diagram of a cross section of the wear-resistant coating 14 formed by electrical-discharge surface treatment. The wear-resistant coating 14 formed by electrical-discharge surface treatment includes the metal particles A, and the first oxide layer B which covers the surfaces of the metal particles A, contains the Al oxide as its main component, and contains the Y oxide. Incidentally, although the foregoing descriptions have been provided for the configuration in which the electrical-discharge surface treatment is performed in the electrically-insulating liquid, the electrical-discharge surface treatment may be performed in the atmosphere or the like.

The wear-resistant coating 14 can be formed on the slide surface of the slidable component 12 in the above-discussed way. The electrical-discharge surface treatment allows local coating, and the wear-resistant coating 14 can be formed on only specified portions of the slidable component 12.

Next, descriptions will be provided for how the slidable component 10 including a wear-resistant coating works. In a case where the slidable component 10 including a wear-resistant coating slides over a different part while exposed to heat of the high-temperature environment of over 1000° C. in the atmosphere such as in an oxidizing atmosphere, the oxidation of the metal particles in the wear-resistant coating 14 is inhibited since the metal particles are covered with the first oxide layer containing the Al oxide as its main component. Even in a case where the slidable component 10 including a wear-resistant coating is repeatedly exposed to the heat, the adhesion between the metal particles and the first oxide layer is increased since the first oxide layer contains the Y oxide, and the delamination of the first oxide layer from the metal particles is inhibited. In addition, since the wear-resistant coating 14 contains the first oxide layer, the lubricity of the wear-resistant coating 14 over the different part is increased to enhance the wear resistance of the wear-resistant coating 14.

Figure 5:
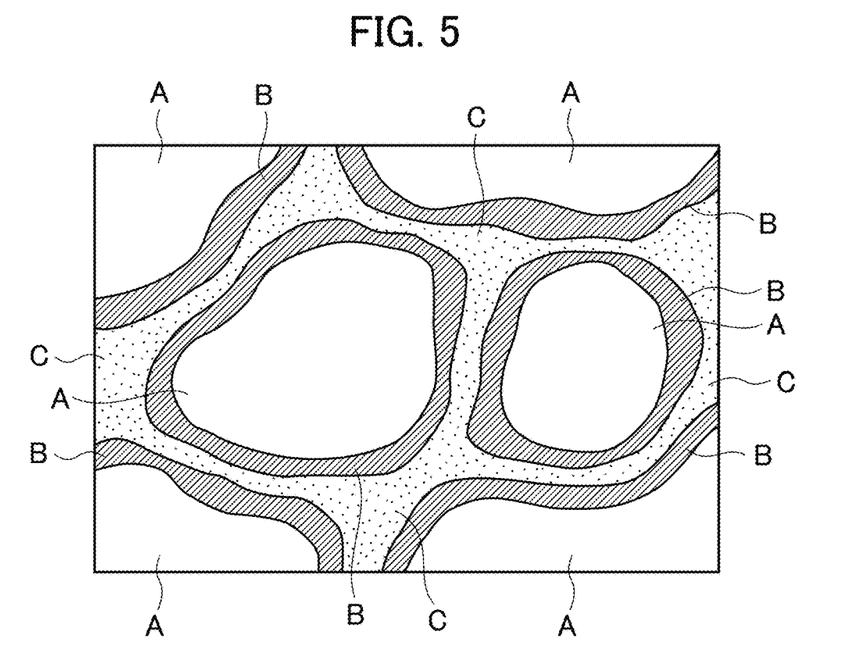
FIG. 5 is a schematic diagram illustrating a cross section of the wear-resistant coating including a second oxide layer according to the embodiment of the present disclosure.

Moreover, in the environment of 1000° C. or less which leads to the high-temperature environment of over 1000° C., the second oxide layer containing the Cr oxide as its main component is formed between the metal particles covered with the first oxide layer in the wear-resistant coating 14 formed by electrical-discharge surface treatment since Cr contained in the metal particles is oxidized. FIG. 5 is a schematic diagram of a cross section of the wear-resistant coating 14 including the second oxide layer. The wear-resistant coating 14 includes the metal particles A, the first oxide layer B covering the metal particles A, containing the Al oxide as its main component, and containing the Y component, and the second oxide layer C formed between the metal particles A covered with the first oxide layer B, and containing the Cr oxide as its main component. When the wear-resistant coating 14 formed by electrical-discharge surface treatment is exposed to the heat in the oxidation atmosphere, mainly Cr contained in the metal particles A diffuses toward the surface of the first oxide layer B. Thereafter, Cr diffusing over the surface of the first oxide layer B is oxidized to form the second oxide layer C containing the Cr oxide as its main component. Thereby, the wear resistance of the wear-resistant coating 14 is improved more.

It should be noted that the method of forming the wear-resistant coating 14 includes an oxidation process step of forming the second oxide layer after the electrical-discharge surface treatment step (S12). In the oxidation process step, the oxidation process can be performed at 600° C. or greater in the atmosphere such as in the oxidation atmosphere. The oxidation process can form the second oxide layer containing the Cr oxide as its main component, between the metal particles covered with the first oxide layer by diffusing Cr contained in the metal particles over the surface of the first oxide layer, and oxidizing the diffused Cr. This makes it possible to form the second oxide layer before the slidable component 10 including a wear-resistant coating is exposed to the actual environment.

Figure 6:
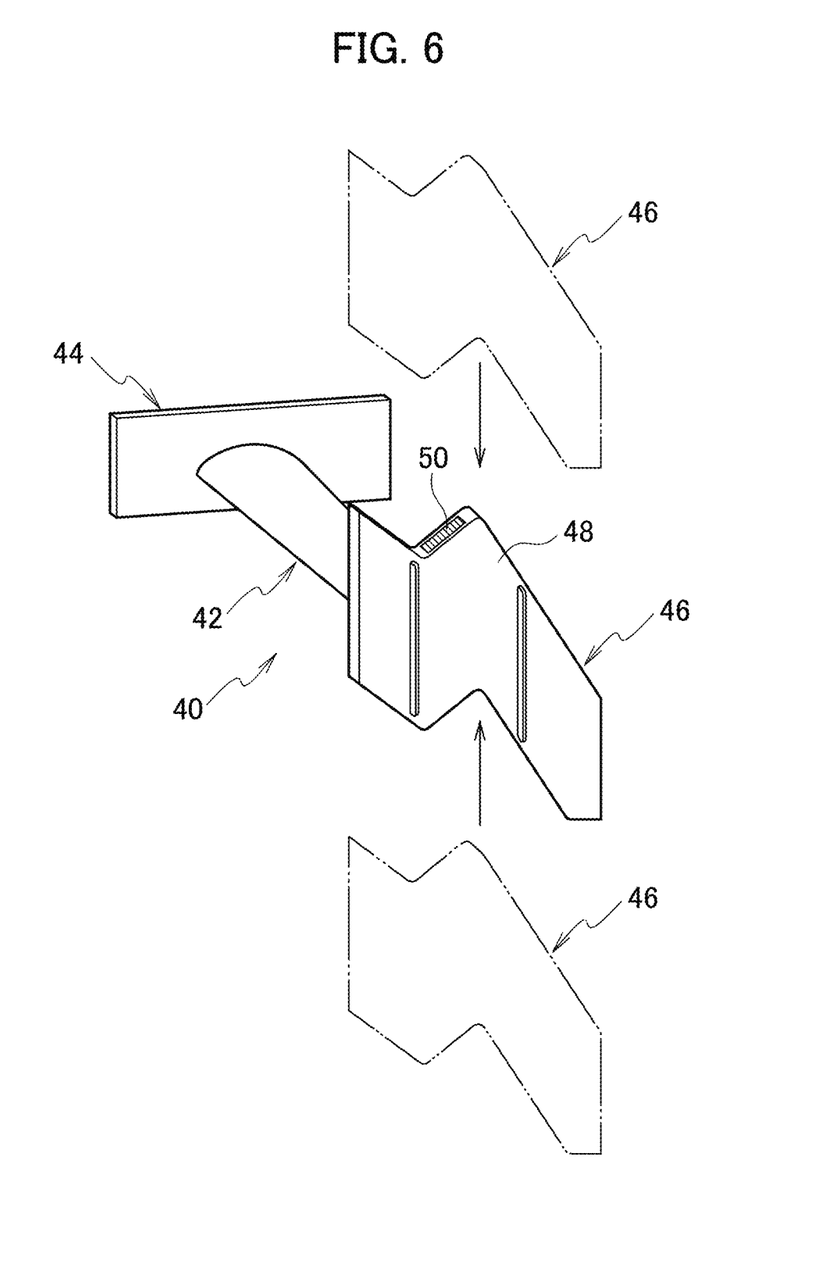
FIG. 6 is a schematic diagram illustrating a configuration of a turbine blade including a shroud portion with a Z notch according to the embodiment of the present disclosure.

Moreover, a turbine blade including a shroud portion with a Z notch may be used for a gas turbine component as the slidable component 12. FIG. 6 is schematic diagram illustrating a configuration of the turbine blade 40 including the shroud portion with the Z notch. The turbine blade 40 includes a blade portion 42, a dovetail portion 44, and the shroud portion 46. The shroud portion 46 includes the Z notch 48. The shroud portion 46 including the Z notch portion 48 is in contact with an adjacent shroud portion 46 indicated with a chain double-dashed line with a side surface 50 of the Z notch 48 interposed in between. While in operation, the turbine blade 40 rotates at high speed, and not only receives periodic deformation and vibration, but also is exposed to a high-temperature combustion gas. The side surface 50 of the Z notch 48 slides while receiving a high surface pressure at high temperature, and wears to a large extent. When the wear-resistant coating 14 is provided on the side surface 50 of the Z notch 48, the wear resistance of the side surface 50 of the Z notch 48 can be increased. Besides, because of electrical-discharge surface treatment, the wear-resistant coating 14 can be accurately formed on the side surface 50 of the Z notch 48, although narrow, while inhibiting deformation.

According to the above configuration, the wear-resistant coating includes the metal particles deposited on the slide surface of the slidable part, and containing Ni, Co and Cr, and the first oxide layer covering the surfaces of the metal particles, containing the Al oxide as its main component, and containing the Y oxide. For this reason, the wear resistance can be increased even in the high-temperature environment of over 1000° C.

EXAMPLES

Forming Electrode for Electrical-Discharge Surface Treatment

To begin with, descriptions will be provided for a method of forming an electrode for electrical-discharge surface treatment. The powder of the NiCoCrAlY alloy was used as the raw material powder. Powder P1365-2 manufactured by Carpenter Powder Products was used as the raw material powder. With regard to its alloy composition, the raw material powder contained 23% by mass of Co, 17% by mass of Cr, 12.5% by mass of Al, 0.6% by mass of Y, 0.8% by mass of Si, and 0.8% by mass of Mn, and the balance including Ni and unavoidable impurities. The 90% cumulative particle diameter ($D_{90}$) in the cumulative particle size distribution of the used raw material powder was smaller than 22 μm.

The raw material powder was pulverized using a swirling-flow-type jet mill at a compressor pressure of 1.2 MPa. The large-particle-size powder was collected using a cyclone, while the small-particle-size powder was collected using a bug filter. The large-particle-size powder with a mean particle size of 8 μm or less whose particles were shaped like a sphere, and the small-particle-size powder with a particle size of 3 μm or less whose particles were shaped like a scale were used as the electrode powder.

The large-particle-size powder and the small-particle-size powder were mixed and granulated to form granulated powder. The slurry was prepared by mixing and stirring the large-particle-size powder, the small-particle-size powder, the binder, the lubricant and the solvent using an agitator. An acrylic resin-based binder was used as the binder. Stearic acid was used as the lubricant. Isopropyl alcohol (IPA) was used as the solvent.

The sum of the amount of large-particle-size powder and the amount of small-particle-size powder was 100% by mass, where the amount of large-particle-size powder was 70% by mass and the amount of small-particle-size powder was 30% by mass. The slurry was prepared by mixing 2% by mass of the binder into the metal powder, and adding 200% by mass of isopropyl alcohol (IPA) to the mixture, followed by stirring. After the slurry was prepared, the solvent was dried using a splay drier, and the granulated powder was formed.

Thereafter, the granulated powder was molded into the green compact by compression molding. The compression molding was performed by filling the granulated powder into the molding die, and pressing the granulated powder in the molding die using a press. The press pressure was 3 ton. The size of the green compact was 14 mm (length)×110 mm (width)×7 mm (height) in a rectangle. After the compression molding, the green compact was processed by cold isostatic pressing. The pressure of the cold isostatic pressing was 25 MPa to 35 MPa.

The green compact was sintered by heating, and was formed in the sintered compact. The sintering was performed by vacuuming using a rotary pump while making a mixed gas of argon and hydrogen flow. The mixed gas contained 95% by mass of Ar and 5% by mass of $H_2$. The electric resistivity was controlled on condition that the sintering temperature was in a range of 750° C. to 950° C., and the holding time was 6 hours. In the above-discussed way, the electrode for diffusion surface treatment was formed.

The electric resistivity of the electrode was measured using a four-terminal method. The coating was possible with an electric resistivity of the electrode in a range of 1 mΩ·cm to 20 mΩ·cm From this measurement result, it was learned that the electrode for diffusion surface treatment was usable.

Electrical-Discharge Surface Treatment

Figure 7:
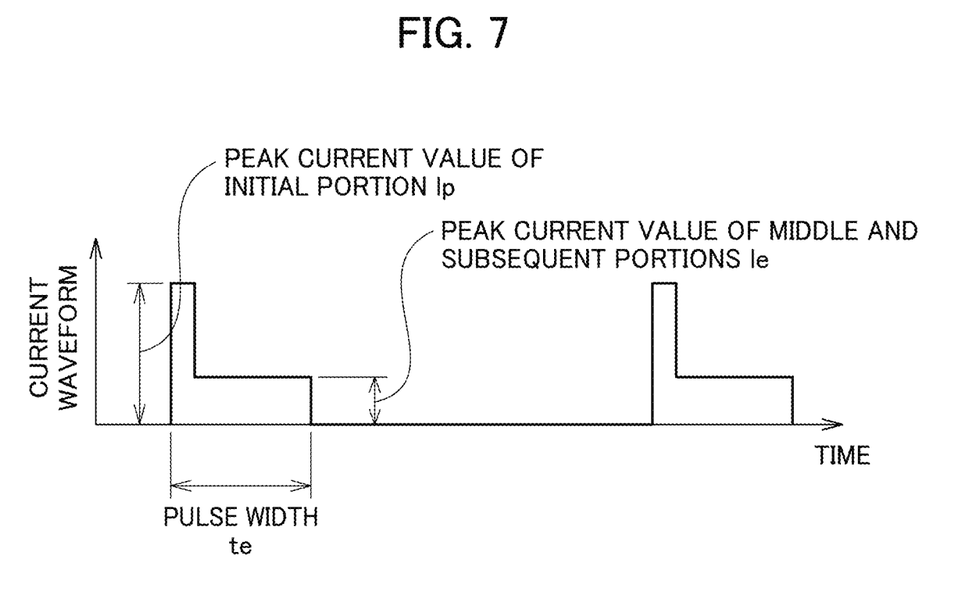
FIG. 7 is a diagram illustrating a waveform of an electrical-discharge pulse current which flows between an electrode and a substrate when a pulsed electrical discharge is caused in between in the embodiment of the present disclosure.

As an example, the wear-resistant coating was formed on the surface of the substrate by subjecting the substrate to electrical-discharge surface treatment in the electric-insulating oil using the electrical-discharge machining apparatus. The substrate was formed from a Ni alloy. FIG. 7 is a diagram illustrating a waveform of an electrical-discharge pulse current which flowed between the electrode and the substrate when a pulsed electrical discharge was caused in between. Conditions for the electrical discharge were as follows. The peak current value Ip of an initial portion of the waveform of the electrical-discharge pulse current which was supplied between the electrode and the substrate was 30 A or 40 A. The peak current value Ie of middle and subsequent portions of the waveform was adjusted between 1 A and 25 A. The pulse width to of the electrical-discharge pulse current was adjusted between 2 µs and 30 µs. In addition, the pause time was set at 64 µs. From the electrical-discharge surface treatment of the substrate using the electrode, it was learned that the wear-resistant coating was able to be formed on the surface of the substrate. The coating thickness of the wear-resistant coating was 300 µm to 400 µm.

Evaluation of Wear-Resistant Coating

Figure 8:
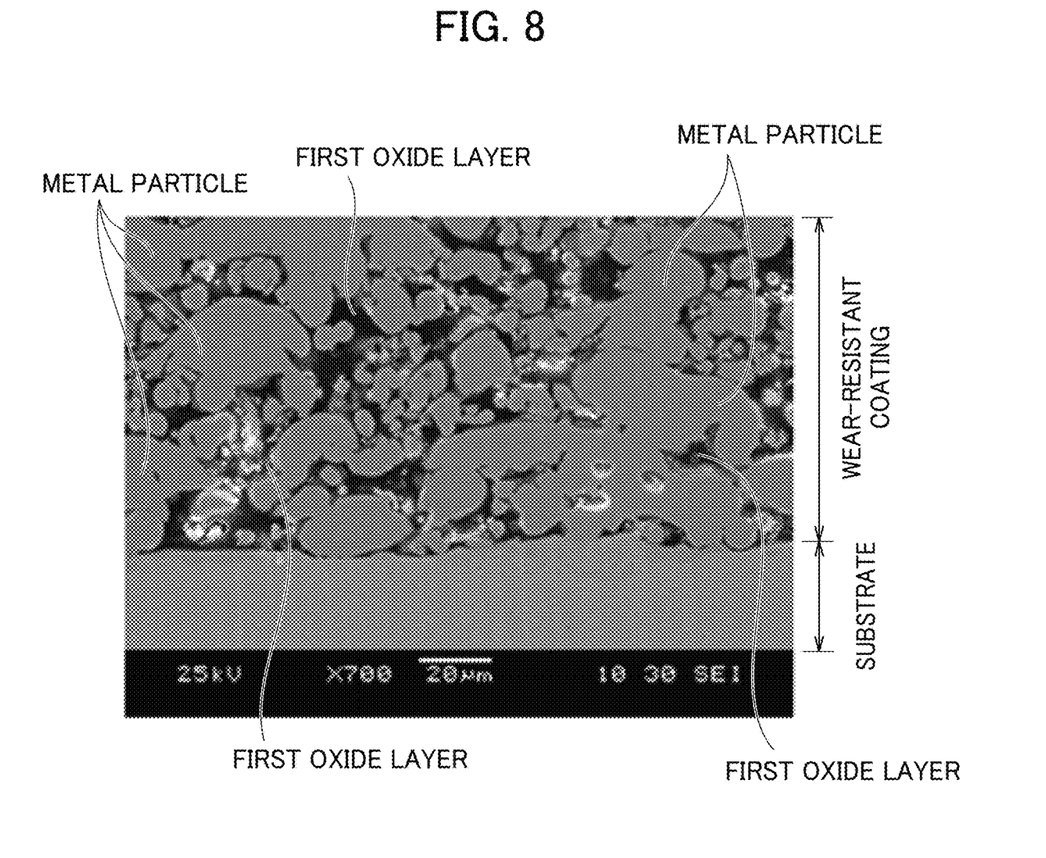
FIG. 8 is an SEM photograph of a cross section of the wear-resistant coating formed by electrical-discharge surface treatment in the embodiment of the present disclosure.

The wear-resistant coating formed by electrical-discharge surface treatment was observed using a scanning electron microscope (SEM). FIG. 8 is an SEM photograph of a cross section of the wear-resistant coating formed by electrical-discharge surface treatment. The wear-resistant coating contained the metal particles deposited on the surface of the substrate, and the first oxide layer formed covering the surfaces of the metal particles. The metal particles are formed in the shape of a dendrite.

A semi-quantitative analysis was applied to the metal particles and the first oxide layer using energy-dispersive X-ray spectroscopy (EDS). With regard to its composition, the metal particles contained 47% by mass of Ni, 24% by mass of Co, 19% by mass of Cr, 9% by mass of Al, and 1% by mass of O. With regard to its composition, the first oxide layer contained 9% by mass of Ni, 5% by mass of Co, 5% by mass of Cr, 44% by mass of Al, 7% by mass of Y, and 30% by mass of O. The first oxide layer contained the Al oxide as its main component, and contained the Y oxide.

Oxidation Test

Figure 9:
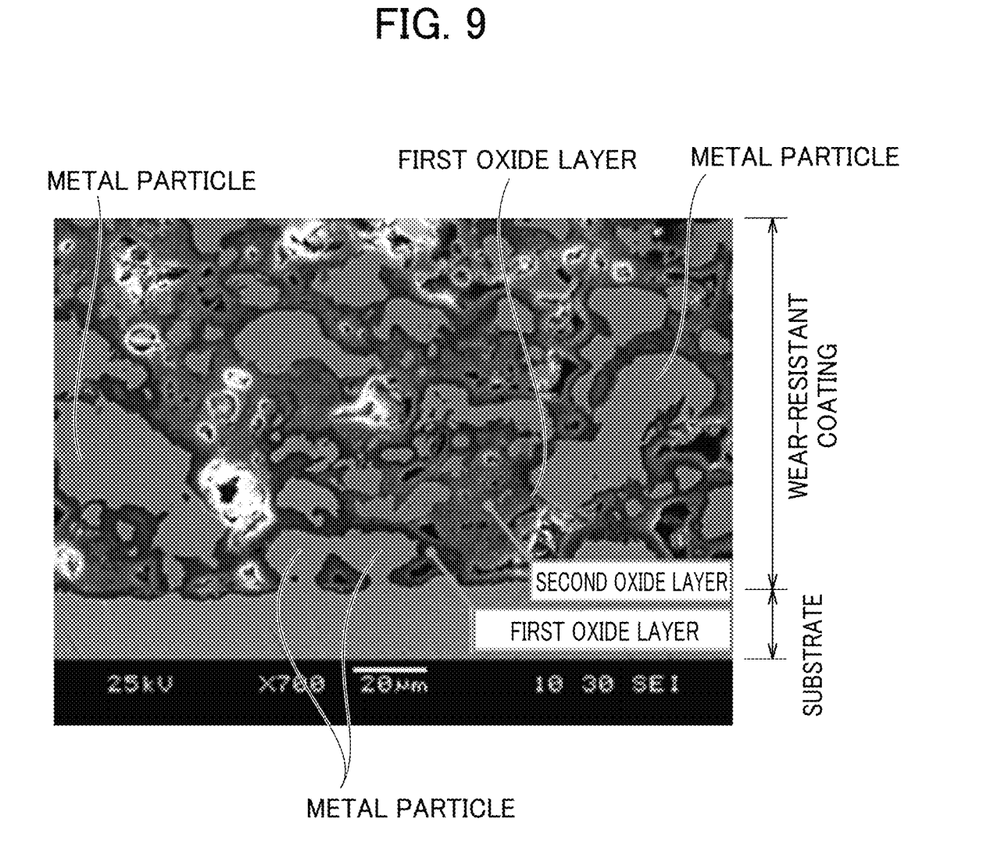
FIG. 9 is an SEM photograph of a cross section of the wear-resistant coating which is observed after a continuous oxidation test in the embodiment of the present disclosure.

The oxidation resistance of the wear-resistant coating formed by electrical-discharge surface treatment was evaluated. As the oxidation test, a continuous oxidation test was performed by continuously exposing the wear-resistant coating to the atmosphere at 1100° C. for 100 hours. After the continuous oxidation test, the wear-resistant coating was observed using a scanning electron microscope (SEM). FIG. 9 is an SEM photograph of a cross section of the wear-resistant coating which was observed after the continuous oxidation test. The wear-resistant coating after the continuous oxidation test contained the metal particles deposited on the surface of the substrate, the first oxide layer formed covering the surfaces of the metal particles, and the second oxide layer formed between the metal particles covered with the first oxide layer.

A semi-quantitative analysis was applied to the metal particles, the first oxide layer and the second oxide layer using energy-dispersive X-ray spectroscopy (EDS). With regard to its composition, the metal particles contained 58% by mass of Ni, 29% by mass of Co, 11% by mass of Cr, and 2% by mass of O. With regard to its composition, the first oxide layer contained 3% by mass of Ni, 2% by mass of Co, 10% by mass of Cr, 45% by mass of Al, 5% by mass of Y, and 35% by mass of O. The first oxide layer contained the Al oxide as its main component, and contained the Y oxide. With regard to its composition, the second oxide layer contained 15% by mass of Ni, 16% by mass of Co, 29% by mass of Cr, 13% by mass of Al, 1% by mass of Y, and 26% by mass of O. The second oxide layer contained the Cr oxide as its main component.

Figure 10:
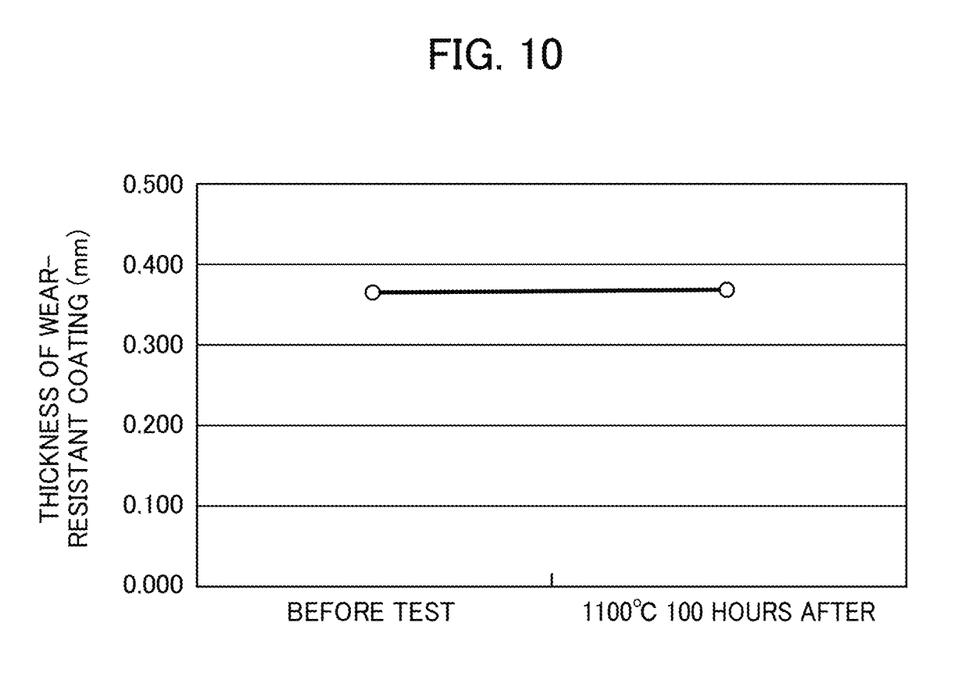
FIG. 10 is a graph showing results of measuring a coating thickness of the wear-resistant coating before and after the continuous oxidation test in the embodiment of the present disclosure.

Before and after the continuous oxidation test, the coating thickness of the wear-resistant coating was measured. The coating thickness of the wear-resistant coating was measured before oxidation test, and 100 hours after the oxidation test. FIG. 10 is a graph showing results of measuring a coating thickness of the wear-resistant coating before and after the continuous oxidation test. In the graph of FIG. 10, the horizontal axis represents before the oxidation test and 100 hours after the oxidation test, while the vertical axis represents the coating thickness of the wear-resistant coating. Almost no change in the coating thickness of the wear-resistant coating was observed before and after the continuous oxidation test.

Figure 11:
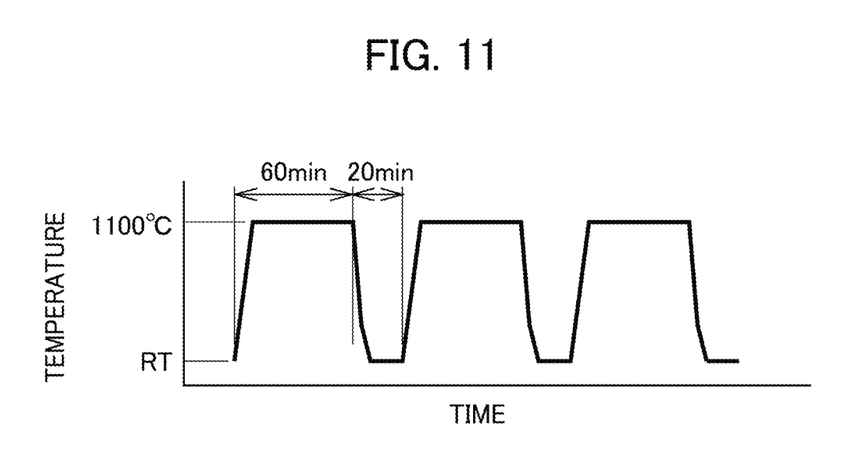
FIG. 11 is a diagram illustrating how a cyclic oxidation test is performed in the embodiment of the present disclosure.
Figure 12:
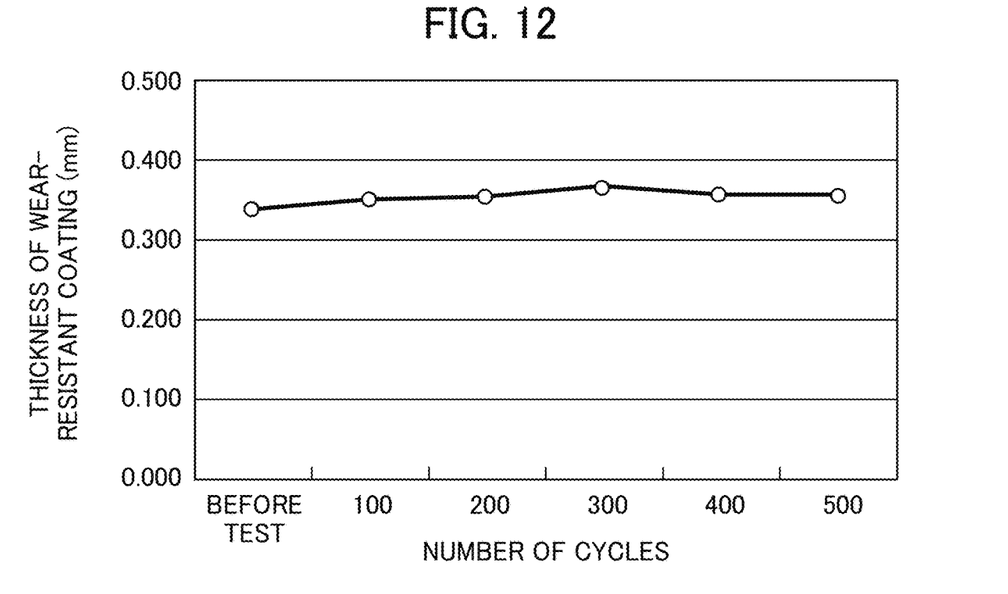
FIG. 12 is a graph showing results of measuring the coating thickness of the wear-resistant coating before and after the cyclic oxidation test in the embodiment of the present disclosure.

Thereafter, as another oxidation test, a cyclic oxidation test was performed by exposing the wear-resistant coating to the atmosphere between room temperature and 1100° C. by 500 cycles. FIG. 11 is a diagram illustrating how the cyclic oxidation test was performed. The coating thickness of the wear-resistant coating was measured before and after the cyclic oxidation test. The coating thickness of the wear-resistant coating was measured each time the number of cycles increased by 100 until the number of cycles reached 500. FIG. 12 is a graph showing results of measuring the coating thickness of the wear-resistant coating before and after the cyclic oxidation test. In the graph of FIG. 12, the horizontal axis represents the number of cycles, while the vertical axis represents the coating thickness of the wear-resistant coating. Almost no change in the coating thickness of the wear-resistant coating was observed before and after the cyclic oxidation test.

In the continuous oxidation test and the cyclic oxidation test, almost no increase the coating thickness of the wear-resistant coating formed by electrical-discharge surface treatment due to the oxidation of the wear-resistant coating was observed, and almost no decrease in the coating thickness of the wear-resistant coating due to the delamination and the like of the wear-resistant coating was observed. It was learned that the wear-resistant coating was good at oxidation resistance even in the high-temperature environment of over 1000° C.

Figure 13:
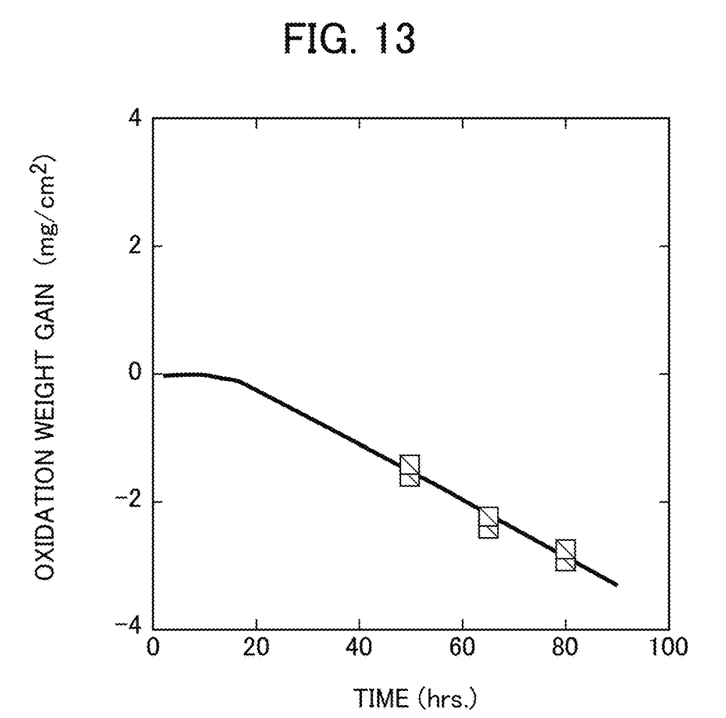
FIG. 13 is a graph showing a result of the cyclic oxidation test of a wear-resistant coating formed from an alloy T-800 in the embodiment of the present disclosure.

As a comparative example, a cyclic oxidation test was performed on a Co-based alloy T-800. With regard to its composition, the alloy T-800 contained 1.5% by mass or less of Ni, 1.5% by mass or less of Fe, 0.08% by mass or less of C, 18% by mass of Cr, 28% by mass of Mo, 3.4% by mass of Si, and the balance including Co and unavoidable impurities. The cyclic oxidation test was performed in the same way as the cyclic oxidation test illustrated in FIG. 11, except that the highest temperature was 1000° C. FIG. 13 is a graph showing a result of the cyclic oxidation test of the wear-resistant coating made from the alloy T-800. In the graph of FIG. 13, the horizontal axis represents oxidation time, while the vertical axis represents oxidation weight gain. In the case of the alloy T-800, a decrease in the weight due to the delamination of oxide film was observed. From this result, it was learned that the wear-resistant coating made from the alloy T-800 was unable to be used in the high-temperature environment of over 1000° C.

Abrasion Test

Figure 14:
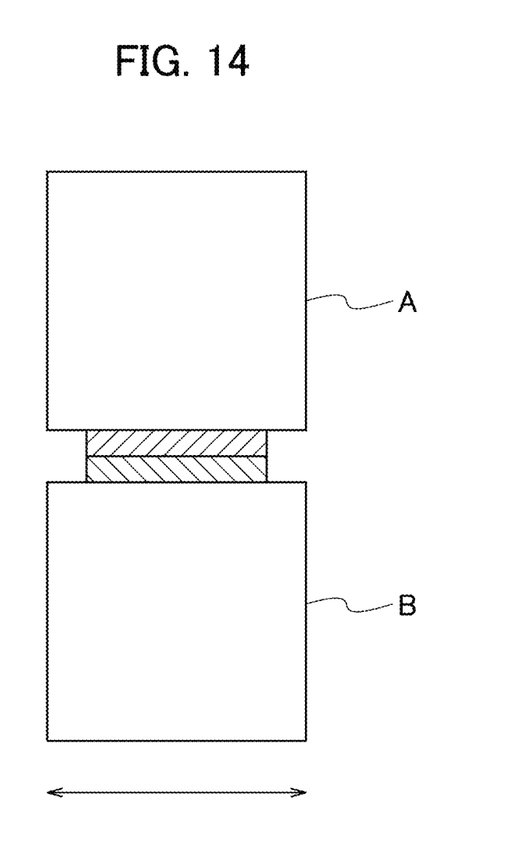
FIG. 14 is a diagram for explaining a fretting wear test in the embodiment of the present disclosure.

Next, the high-temperature wear resistance of the wear-resistant coating formed by electrical-discharge surface treatment according to the example was evaluated by performing fretting wear test on the wear-resistant coating. FIG. 14 is a diagram for explaining the fretting wear test. In the fretting wear test, the amounts of wear of wear-resistant coatings respectively formed on the slide surfaces of the upper and lower jigs A, B by electrical-discharge surface treatment in the same way as discussed above was evaluated by sliding the upper and lower jigs A, B, with their side surfaces faced to each other, in directions indicated with a left-right double arrow while applying surface pressure to the slide surfaces.

The conditions for the test were as follows. The surface pressure was 7 MPa at maximum. The amount of swings (amplitude) was ±0.5 mm. The diameter of each slide surface was 5 mmφ. The number of swings was 100,000. The frequency was 40 Hz. The test environment was the atmosphere at 1080° C. After the wear test, the amount of wear of the wear-resistant coating on the upper jig A and the amount of wear of the wear-resistant coating on the lower jig B are measured. The total of the amount of wear of the wear-resistant coating on the upper jig A and the amount of wear of the wear-resistant coating on the lower jig B was 114 μm. It became clear that the wear-resistant coatings exhibited excellent wear resistance property even in the high-temperature environment of over 1000° C.

The present disclosure can improve the wear resistance of the slidable component including the wear-resistant coating in a high-temperature environment of over 1000° C., and is useful for the gas turbine component and the like.

What is claimed is:

1. A slidable component including a wear-resistant coating, comprising:
   a slidable component; and
   a wear-resistant coating provided on a slide surface of the slidable component, wherein
   the wear-resistant coating includes
   metal particles deposited on the slide surface of the slidable component, and containing Ni, Co and Cr,
   a first oxide layer covering surfaces of the metal particles, containing an Al oxide as its main component, and containing a Y oxide, and
   a second oxide layer formed between the metal particles covered with the first oxide layer, and containing a Cr oxide as its main component.

2. The slidable component including a wear-resistant coating according to claim 1, wherein the metal particles further contain at least one of Al and Y.

3. The slidable component including a wear-resistant coating according to claim 1, wherein the slidable component is a gas turbine component.

4. The slidable component including a wear-resistant coating according to claim 2, wherein the slidable component is a gas turbine component.

5. The slidable component including a wear-resistant coating according to claim 3, wherein
   the gas turbine component is a turbine blade including a shroud portion with a Z notch, and
   the wear-resistant coating is provided on a slide surface of the Z notch.

6. The slidable component including a wear-resistant coating according to claim 4, wherein
   the gas turbine component is a turbine blade including a shroud portion with a Z notch, and
   the wear-resistant coating is provided on a slide surface of the Z notch.

* * * * *